UNITED STATES PATENT OFFICE
PTO – BOYERS, PA DUTY STATION

---

PAGE NOT AVAILABLE

PATENT NUMBER X 5028 FOR THE ISSUE DATE 3/18/1828 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing All Drawings

DATA CONVERSION OPERATION
BOYERS, PA

X 5028 3-18-1828
Mar. 8. 1828 29

William Magaw

The Schedule referred to in these Letters Patent and
making part of the same containing a description
in the words of the said William Magaw him
self of his improvement in the manufacture of paper
from straw, hay or other vegetable substances. for which
Letters Patent were granted to said William Ma-
gaw to wit: on the 8th day of March 1828. and on
the 22nd day of May in the same year, which Let-
ters Patent being hereby cancelled on account of de-
fective Specifications. This improvement
or discovery consists in the use of ley and its salts in
preparing straw, hay or other vegetable substances for the
manufacture of paper in the following manner viz:
To one hundred and twenty pounds of the straw or hay
take the ley procured from three or four bushels of ash-
es, or from fifteen or twenty pounds of the salts of ley
according to the quality, dilute it with a sufficiency
of water to boil the straw or hay which need not be
all immersed at the commencement as it will sink
during the process of boiling. boil the materials together
until the vegetable matter and knots become soft or
pulpy, or steep the materials in the solution sev-
eral days untill the same effect is produced. draw
off the remaining liquid and rinse the materials
to cleanse them from any dirt or sediment; then grind
them in the usual way to be manufactured like
rags into paper. The petitioner claims as his exclu-
sive improvement or discovery the use of the ley and
its salts and the mode of preparing the materials so
as to render them fit for the manufacture of paper.
Witnesses. P. H. Riddle
Wm Chappotin William Magaw